United States Patent [19]

Buehl

[11] Patent Number: 4,918,720
[45] Date of Patent: Apr. 17, 1990

[54] CIRCUIT DEVICE FOR CONTROLLING THE ACTUATED STATE OF AN ELECTRIC APPLIANCE

[76] Inventor: George T. Buehl, 5035 Forest Lane Cir., Dallas, Tex. 75244

[21] Appl. No.: 249,748

[22] Filed: Sep. 27, 1988

[51] Int. Cl.⁴ .............................................. H04M 1/00
[52] U.S. Cl. ..................................... 379/376; 379/396
[58] Field of Search ............... 379/102, 104, 105, 373, 379/376, 396, 377, 442, 443

[56] References Cited

U.S. PATENT DOCUMENTS

| | | | |
|---|---|---|---|
| 3,412,213 | 11/1968 | McCay | 379/377 |
| 4,140,884 | 2/1979 | Ouimet et al. | 379/373 |
| 4,467,144 | 8/1984 | Wilkerson et al. | 379/373 |
| 4,747,133 | 5/1988 | Valenzona et al. | 379/376 |
| 4,821,314 | 4/1989 | Guyader et al. | 379/376 |

FOREIGN PATENT DOCUMENTS 2846667  5/1980  Fed. Rep. of Germany ...... 379/376

*Primary Examiner*—Jin F. NG
*Assistant Examiner*—Bonita F. Lewis
*Attorney, Agent, or Firm*—Townsend and Townsend

[57] ABSTRACT

The invention discloses a control circuit device of a desk lamp apparatus which is used in association with a telephone set. This circuit device may be actuated by an input signal from a telephone line for the duration of a call in order to provide a full light source over the place surrounding the telephone. A delay circuit is provided to prolong the actuated state of the circuit device for a period of time after a phone conversation is over.

13 Claims, 2 Drawing Sheets

CIRCUIT DEVICE FOR CONTROLLING THE ACTUATED STATE OF AN ELECTRIC APPLIANCE

BACKGROUND OF THE INVENTION

The present invention relates to a circuit device for controlling the actuated state of an electric appliance, and more particularly to a circuit device of a desk lamp apparatus associated with a telephone for providing a full light source for the need of the user.

Answering the phone in a dark or dimly lit room is a very common and often very hazardous household occurrence. Objects in the room as well as the phone itself are difficult to find, providing the opportunity for a wide range of mishaps and accidents to occur. To prevent these hazards and to ensure that the phone is answered in time one is tempted to leave the light on all the time but this solution is neither prudent nor economical.

Therefore, the present invention is provided with a circuit device of a desk lamp associated with a telephone which can overcome the above-mentioned hazards and inconveniences.

SUMMARY OF THE INVENTION

It is accordingly a primary object of the invention to provide a circuit device of a desk lamp apparatus associated with a telephone in a such a way that the desk lamp may be actuated by a ring of the telephone to illuminate the place surrounding the telephone. In addition, once the user has finished talking and replaced the receiver, the light will remain on for a period of time (approximately thirty seconds), and then will extinguish automatically, this prolonged actuated period enabling the user to leave the room or go back to bed.

A circuit device according to the invention is responsive to an incoming signal transmitted along a telephone line for controlling the activated state of an electric appliance, comprising:

Means, preferably a resistor, picks up the incoming signal from said telephone line.

An actuating signal generator is coupled to the resistor generating an actuating signal in response to the signal picked-up.

A first transistor includes a first base, collector and emitter electrodes. The first base electrode is operatively coupled to the actuating signal generator so as to allow the first transistor to be turned on by the actuating signal.

A second transistor includes a second base, collector and emitter electrodes. The second emitter electrode is adapted to connect to one terminal of a unidirectional voltage source for biasing the second transistor. The second collector electrode is adapted to connect through the electric appliance to the other terminal of said unidirectional voltage source. The second base electrode is coupled to the first collector electrode such that the second transistor turns on when the first transistor means turns on.

For the duration of a call, the first and second transistors are turned on to allow power of the voltage source to be applied to the electric appliance.

BRIEF DESCRIPTION OF THE DRAWINGS

Other advantages and characteristics of the invention will become clear from the following detailed description of a preferred embodiment when read in conjunction with the accompanying drawings.

DETAILED DESCRIPTION OF THE PREFERRED EMBODIMENT

Figure 1:
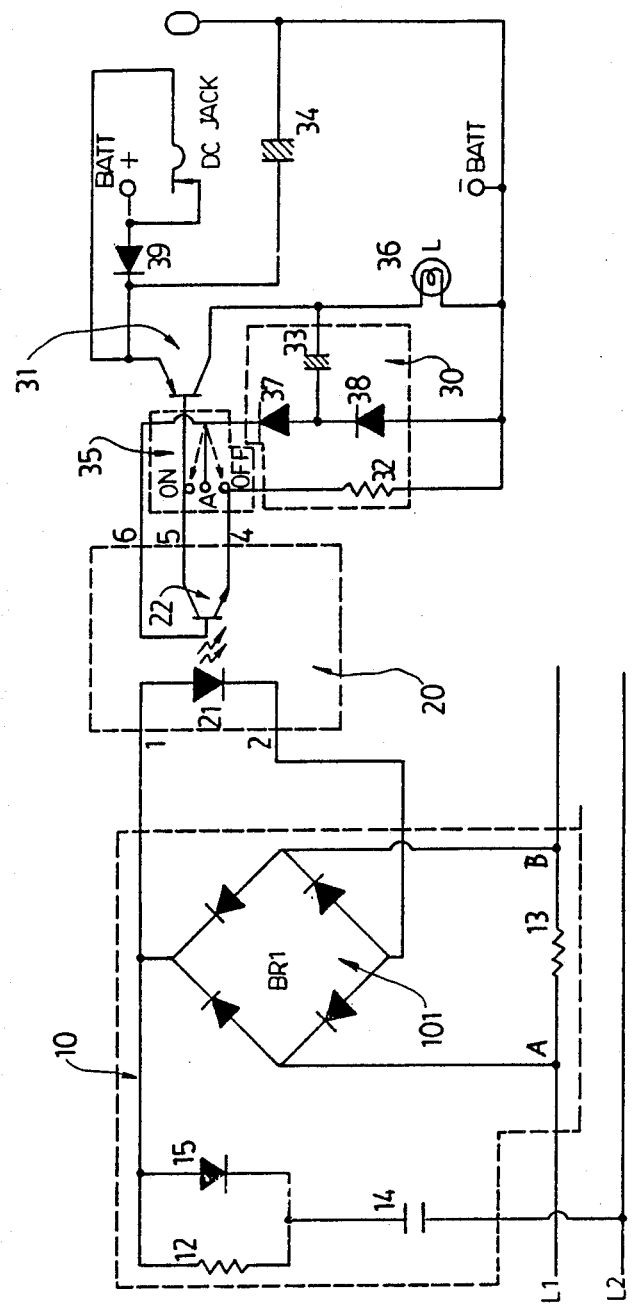
FIG. 1 shows a circuit diagram of a desk lamp apparatus associated with a telephone according to the invention.

Referring now to FIG. 1, there is shown a circuit diagram of a desk lamp apparatus connected to telephone lines L1, L2. The desk lamp apparatus is composed of a rectifier device 10, a photoelectric element 20, a selecting switch 35, a transistor 31 and a delay circuit 30. The rectifier device 10 includes a resistor 13 connected between two points A and B of the line L1, a rectifier 101 having two input terminals connected across resistor 13, a diode 15, a resistor 12, a capacitor 14. The capacitor 14 is coupled between line L2 and a parallel combination of diode 15 and resistor 12. A photoelectric element 20 includes a light emitting diode (LED) 21 and a photo-transistor 22. The terminals of LED 21 is connected to the output ends of the bridge-rectifier 101. The collector electrode of the photo-transistor 22 is connected to the base electrode of the transistor 31 through selecting switch 35, and the emitter electrode of the photo-transistor 22 being connected to the negative terminal of the battery through resistor 32. The aforementioned photoelectric element 20 may be a photocoupler IC, for example, a 4N25 type optocoupler manufactured by TELEFUNKEN, MOTOROLA, or SIEMENS. In addition, the emitter electrode of the transistor 31 is connected to the positive terminal of the battery through diode 39, and the collector electrode thereof is connected to the negative terminal of the battery through a lamp 36. It should be noted that a delay circuit including a capacitor 33 and a resistor 32 is electrically connected to the transistors 22 and 31, and a selecting switch 35 is connected between the photo-transistor 22 and transistor 31 for selecting different operations. In addition, diode 37, 38, and 39 can maintain normal operation of the circuit preventing simultaneous results.

The operation of the circuit in FIG. 1 is as follows:

Once a ring signal of the telephone comes into the lines L1, L2, the signal is picked up by the resistor 13 to actuate the LED 21 through the bridge-rectifier 101, the diode 15, the resistor 12, and the capacitor 14. Then, photo-transistor 22 is actuated by receiving the optical signal coming from LED 21, the transistor 31 is thus actuated. At this time, the lamp 36 is lighted by the power source through a loop of diode 39, the emitter and the collector electrodes of the transistor 31. In short, the desk lamp will be lighted on by a ring call of telephone coming and illuminate the place of surrounding the telephone. During this time, the capacitor 33 is charged along the loop of diode 37 through the base electrode and emitter electrode of the photo-transistor 22 to resistor 32.

While the user holds the receiver to answer call, the voltage signals of the telephone lines can still go on offering a signal to actuate the diode 21 so that the desk lamp is lighted. Further, when a conversation has been finished and hang up the receiver, the telephone lines L1, L2 will no longer offer the signal. Thus the LED 21 is deactivated, and photo-transistor 22 is deactuated.

Under normal circumstance, the desk lamp would be cut off, but because of the effect of the discharge function of capacitor 33, the desk lamp will remain on for a preset period of time and extinguish automatically. Also, this preset period of time may provide the user to leave to room under illuminated conditions. It should be noted that the invention can also be used in an ON-OFF operation mode. That is, a selecting switch 35 is provided on the base electrode of the photo-transistor 22. The switch 35 has an ON position, an OFF position and an, A position, three different position choices as shown in FIG. 1. When the switch 35 is switched to the ON position, it will actuate the transistors 31 and light the desk lamp. If the switch 35 is put on the OFF position, the desk lamp will extinguish. Further, when the switch 35 is switched to the A position, the actuated state of the desk lamp will depend on the presence of an incoming call as described above.

Figure 2:
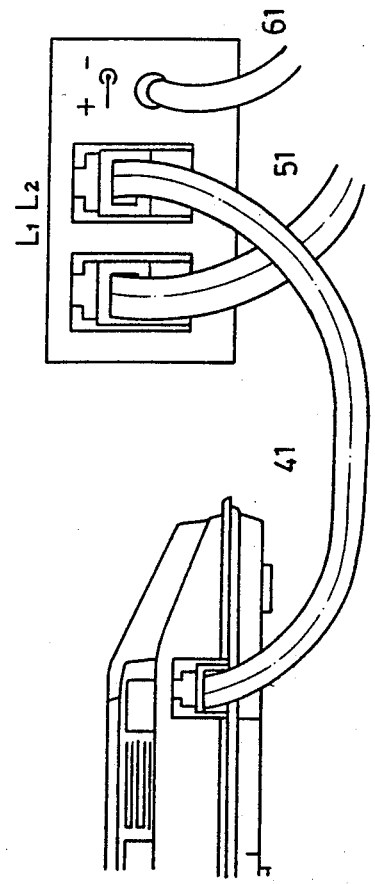
FIG. 2 illustrates the outside connection between a telephone set and the inventive apparatus according to the embodiment of FIG. 1.

Referring to FIG. 2, there is shown an outside connection of a desk lamp apparatus according to this invention with a telephone set. A line 41 from a telephone set is electrically connected to the rear panel of the desk lamp, a line 51 is connected to a wall jack, and a power line 61 is connected to a power supply such as an AC adaptor.

While I have shown and described a present embodiment of the invention, it is to be distinctly understood that the invention is not limited thereto but may be otherwise variously embodied within the scope of the following claims.

I claim:

1. A circuit device responsive to an incoming signal transmitted along a telephone line for controlling an activated state of an electric appliance, comprising:
    means for picking up said incoming signal from said telephone line, said means for picking up comprising a resistor disposed in said telephone line, rectifier means having a pair of input terminals connected across said resistor means, and a pair of output terminals adapted to output said picked-up signal;
    means coupled to said picking-up means for generating an actuating signal in response to said picked-up signal;
    first transistor means having first base, collector and emitter electrodes, said first base electrode being operatively coupled to said actuating signal generating means so as to allow said first transistor means to be turned on by said actuating signal; and
    second transistor means having second base, collector and emitter electrodes, said second emitter electrode being adapted to connect to one terminal of a unidirectional voltage source for biasing said second transistor means, said second collector electrode being adapted to connect through said electric appliance to the other terminal of said unidirectional voltage source, and said second base electrode being coupled to said first collector electrode such that said second transistor means turns on when said first transistor means turns on;
    whereby, during the duration of the incoming signal along said telephone line said first and second transistor means are turned on to allow power of said voltage source to be applied to said electric appliance.

2. A circuit device as claimed in claim 1, further comprising switch means having a first switching position arranged such that when in said first switching position, said switch means short-circuits said first collector electrode and said first base electrode.

3. A circuit device as claimed in claim 2, wherein said switch means further has a second switching position arranged such that when in said second switching position, said switch means short-circuits said first base electrode and said first emitter electrode.

4. A circuit device as claimed in claim 1, wherein said actuating signal generating means comprises light emitting means having a pair of terminals to receive said picked-up signal, thereby said light emitting means can generate a light signal in response to said picked-up signal.

5. A circuit device as claimed in claim 4, wherein said light emitting means is a light emitting diode.

6. A circuit device as claimed in claim 4, wherein said first transistor means comprises a phototransistor with a base electrode optically coupled to said light emitting means, thereby said phototransistor is turned on in response to said light signal.

7. A circuit device as claimed in claim 6, wherein said phototransistor is of npn type.

8. A circuit device as claimed in claim 7, wherein said second transistor means comprises a pnp type transistor.

9. A circuit device as claimed in claim 1, wherein said rectifier means comprises a bridge rectifier.

10. A circuit device as claimed in claim 1, wherein said electric appliance is a lamp.

11. A circuit device responsive to an incoming signal transmitted along a telephone line for controlling an activated state of an electric appliance, comprising:
    means for picking up said incoming signal from said telephone line;
    means coupled to said picking-up means for generating an actuating signal in response to said picked-up signal;
    first transistor means having first base, collector and emitter electrodes, said first base electrode being operatively coupled to said actuating signal generating means so as to allow said first transistor means to be turned on by said actuating signal;
    second transistor means having second base, collector and emitter electrodes, said second emitter electrode being adapted to connect to one terminal of a unidirectional voltage source for biasing said second transistor means, said second collector electrode being adapted to connect through said electric appliance to the other terminal of said unidirectional voltage source, and said second base electrode being coupled to said first collector electrode such that said second transistor means turns on when said first transistor means turns on; and
    capacitor means having a predetermined capacitance and being connected between said first base electrode and said second collector electrode, thereby after said actuating signal from said actuating signal generating means ceases, said first transistor means is activated by the charge in said capacitor means for a predetermined period of time;
    whereby, during the duration of the incoming signal along said telephone line said first and second transistor means are turned on to allow power of said voltage source to be applied to said electric appliance.

12. A circuit device as claimed in claim 11, wherein said picking-up means comprises resistor means disposed in said telephone line.

13. A circuit device as claimed in claim 12, wherein said picking-up means further comprises rectifier means having a pair of input terminals connected across said resistor means, and a pair of output terminals adapted to output said picked-up signal.

* * * * *